April 4, 1961 C. E. CARTER ET AL 2,978,513
OXO PROCESS
Filed April 15, 1957
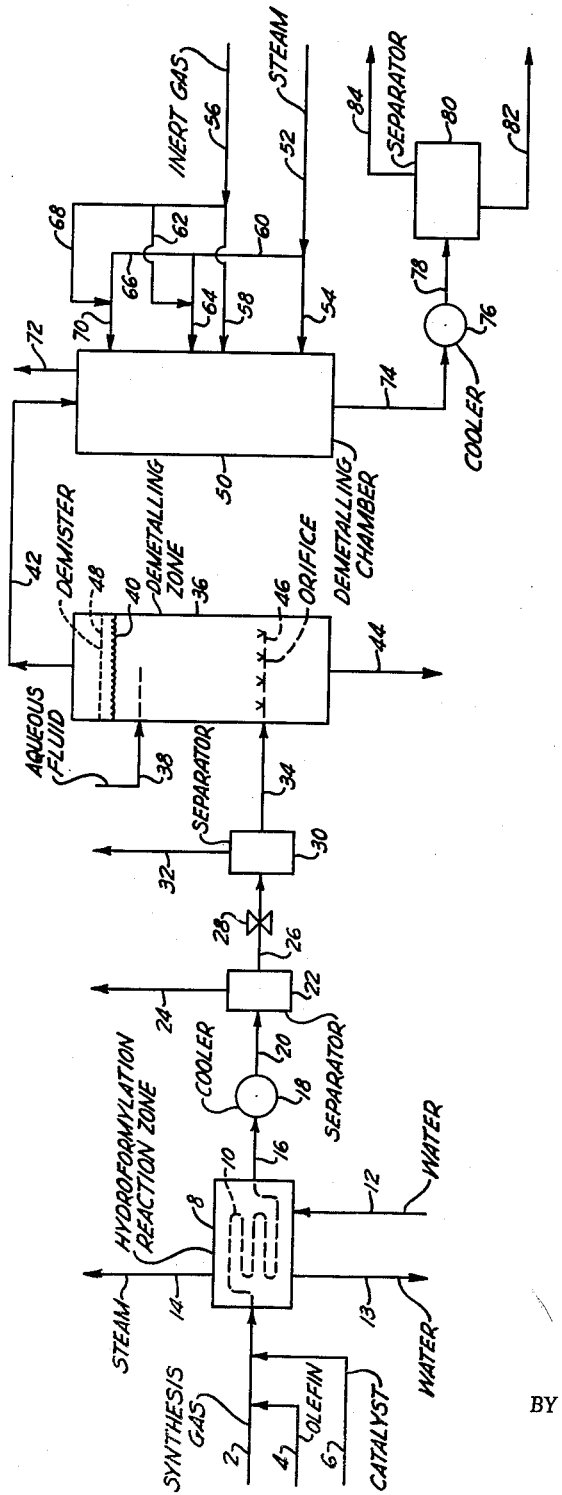
INVENTORS
CHARLES E. CARTER
REX W. SMYTH
BY
THEIR ATTORNEY

United States Patent Office 2,978,513
Patented Apr. 4, 1961

2,978,513

OXO PROCESS

Charles E. Carter, Canonsburg, and Rex W. Smyth, Tarentum, Pa., assignors to Gulf Research & Development Company, Pittsburgh, Pa., a corporation of Delaware Filed Apr. 15, 1957, Ser. No. 652,680

4 Claims. (Cl. 260—604)

This invention relates to a process for removing metals from a stream containing the metals as carbonyls. More particularly, this invention relates to a process for removing catalytic metals and metals employed in making steel alloys from hydroformylation reaction products containing the metals as carbonyls.

During the hydroformylation of olefins, which is also known as the carbonylation or oxonation of olefins, a product stream is produced which contains a mixture of hydroformylation reaction products and unreacted olefins, carbon monoxide and hydrogen. The hydroformylation reaction products usually comprise a large proportion of aldehydes having one more carbon atom than the olefin charged, and lesser amounts of alcohols, acetals and other organic products. The product stream discharged from the hydroformylation reaction stage is at a hydroformylation pressure which is usually in the range of about 1500 to about 5000 pounds per square inch, and a hydroformylation reaction temperature which is usually in the range of about 100° to about 600° F.

The hydroformylation reaction product stream also contains dissolved in the mixture of reaction products and unreacted olefins a catalytic metal carbonyl. The catalytic metal is originally introduced into the hydroformylation reaction stage as the carbonyl or is converted to the carbonyl in the reaction zone. Cobalt, and in some cases iron, is generally employed as the catalytic metal.

The hydroformylation reaction zone and the transfer lines used in the hydroformylation stage are usually made of iron alone or combined with metals such as nickel, chromium and molybdenum. The reactants in the hydroformylation stage slowly dissolve the walls of the reactor and the transfer lines. In this way iron, nickel, chromium and molybdenum carbonyls can be formed when the reactor and transfer lines contain such metals. The hydroformylation reaction products, the unreacted olefins, carbon monoxide and hydrogen and the dissolved metal carbonyls together comprise the total reaction products from the hydroformylation stage.

It is desirable to remove the metal carbonyls from the reaction products as the first step in recovering aldehydes and other hydroformylation reaction products from these products, because the metal carbonyls catalyze condensation reactions of the aldehydes at the temperatures usually employed in separating aldehydes. When the hydroformylation reaction products are sent directly to the hydrogenation stage of the Oxo process it is also desirable to remove the metal carbonyls, for under the conditions of hydrogenation, metal carbonyls in the charge thereto are decomposed and the corresponding metals are deposited upon the hydrogenation catalyst. When an appreciable amount of metal such as cobalt or iron is deposited on the hydrogenation catalyst and covers the surface thereof, the efficiency of the hydrogenation catalyst is appreciably reduced. In addition, when the metal carbonyls are decomposed in the hydrogenation zone, the free metal and carbon monoxide released therewith act as poison for many of the hydrogenation catalysts employed therein. In many cases even a small amount of any of the defined metals or carbon monoxide causes a substantial reduction in yield in the hydrogenation stage.

Accordingly, it is apparent that it is highly desirable to remove from the hydroformylation reaction product metal carbonyls admixed therewith prior to subjecting the hydroformylation reaction product to further reaction. In fact many demetalling operations have been proposed for use in the Oxo process, of which a number are in commercial operation.

In accordance with the present process, the hydroformylation reaction product containing dissolved metal carbonyls is passed sequentially to at least two demetalling zones. In the first of the demetalling zones the hydroformylation reaction product, in the form of droplets, is moved countercurrently to the flow of a heated aqueous medium under carefully controlled reaction conditions, whereby substantially all of the metal carbonyls are decomposed. The treated hydroformylation reaction product is subsequently passed to an additional demetalling zone wherein substantially all of the metal carbonyls not removed in the first demetalling zone are decomposed and removed therefrom. The demetalling zones are not operated under similar conditions, and of course more than one of each can be used if desired. The hydroformylation reaction product can then be treated to recover aldehydes therefrom or passed to the hydrogenation stage wherein the aldehyde is converted to the corresponding alcohol without fear that the metal carbonyls, the corresponding metals or carbon monoxide will adversely affect the desired reactions.

In order that the invention may be understood more fully, reference should be had to the accompanying drawing which is hereby incorporated in and made a part of the present specification. The drawing illustrates a preferred embodiment of the demetalling process defined herein.

Referring to the drawing, synthesis gas comprising a mixture of carbon monoxide and hydrogen is introduced into the system by line 2, olefin or olefins by line 4 and catalyst by line 6. The hydrogen to carbon monoxide mol ratio can vary from about 0.5:1 to about 8:1, but in general preferred results are obtained with a mol ratio of about 1:1 to about 3:1. Any olefin or mixture of olefins can be employed, but preferred results are obtained from a commercial viewpoint, when the olefin has at least about 4 carbon atoms, preferably about 4 to about 16 carbon atoms. Examples of suitable olefins which can advantageously be used in our process, either alone or mixtures thereof, are hexenes, heptenes, octenes, dipropylenes, tripropylenes, tetrapropylenes, pentapropylenes, diisobutylene, triisobutylene, tetraisobutylene, etc. A mixture containing both 1- and 2-olefins can also be used. The molar amount of olefin employed will depend of course on the amount of hydrogen and carbon monoxide used, for in the hydroformylation reaction the reactants are consumed in equal molar proportions. As catalyst we prefer to employ a salt of a catalytic metal, such as cobalt or iron, which under the conditions of the process is soluble in the olefin charge. Although both iron and cobalt salts can be used in the process, best results are obtained with cobalt salts such as cobalt naphthenate or the cobalt salts of higher aliphatic acids such as 2-ethyl hexanoic acid, lauric, palmitic and stearic acids. In general the catalyst should be introduced into the reaction area in an amount corresponding to about one molecular proportion of cobalt for each 600 mols of olefin.

The mixture of synthesis gas, olefin and the hydroformylation reaction catalyst is combined in line 2, passed to the hydroformylation reaction zone 8 wherein the olefins react with hydrogen and carbon monoxide in the presence of the catalyst to form a hydroformylation reaction mixture comprising aldehydes, unreacted olefins, hydrogen and carbon monoxide, dissolved cobalt, carbonyl, when a cobalt salt is employed as catalyst, and alloying metal carbonyls of iron, nickel, chromium and molybdenum. The pressure in the hydroformylation reaction zone is about 1500 to about 5000 pounds per square inch and the temperature about 100° to about 600° F. Residence time is at least about 10 minutes and preferably about 20 to 60 minutes.

While the form of the hydroformylation reaction zone is not critical we prefer to employ an elongated coil 10 in indirect heat exchange relationship with an aqueous medium such as water. The liquid, such as water, enters the reaction zone by way of line 12, absorbs heat given off by the reaction occurring within coil 10 and, in so doing, some of the water vaporizes and is withdrawn as steam by line 14. Since the water is at its boiling point, its temperature, and hence the temperature of the hydroformylation coil, can be closely controlled by controlling the pressure by means of a pressure control valve on line 14. Some of the heat of reaction may also be removed by withdrawing hot water (liquid phase) by line 13 which will reduce the amount of steam generated and will purge the hot water system of undesirable metals or salts which may be left behind in the liquid phase when the steam is generated. These salts would otherwise form as scale on the outside of the tubes and reduce the heat transfer efficiency. Furthermore this hot water withdrawn is at the proper temperature and in the desired amount for use in the subsequent demetalling apparatus described hereinafter. The coil is extremely long compared to its diameter, which is about one to about 5 inches, having an elongation factor (ratio of length to diameter) of at least 1440. In this way the exothermic heat of reaction is quickly and easily removed from the reaction zone, and control of temperature within the coil 10 can be maintained.

The hydroformylation reaction product at substantially the reaction temperature is removed by line 16 and passed through cooler 18 wherein the temperature is reduced, preferably to a temperature below that at which cobalt carbonyl will decompose under the existing conditions, namely about 100° to about 120° F. From cooler 18 the cooler product is passed by line 20 to high pressure separator 22 wherein unreacted synthesis gas is removed overhead by line 24. The hydroformylation reaction product is then passed from separator 22 through line 26 provided with a pressure reducing valve 28 to low pressure separator 30 which is preferably operated at a pressure of about 200 to about 500 pounds per square inch. Additional unreacted synthesis gas is removed overhead in line 32 from separator 30. If desired, the synthesis gas in lines 24 and 32 can be decobalted and recycled by apparatus not shown.

From separator 30 the hydroformylation reaction product is led by line 34 into demetalling zone 36 and dispersed therein adacent the lower portion thereof. At the same time hot water or other suitable aqueous fluid is passed into demetalling zone 36 by line 38 adjacent the upper end thereof. The demetalling zone is maintained substantially full of water and the level thereof 40 is held slightly below the top of the demetalling zone. The hydroformylation product, being lighter than the water, will move upwardly therethrough, float on the top thereof and be continuously removed from the demetalling zone 36 by line 42. The hot water, on the other hand, will move downwardly and be continuously removed from demetalling zone 36 by line 44.

In order to effect appreciable decomposition, that is, at least about 50 percent and preferably at least about 75 percent, of the metal carbonyls in the hydroformylation reaction product entering demetalling zone 36, it is absolutely necessary that the reaction conditions therein be maintained within certain well-defined limits. In order to decompose the metal carbonyls the temperature level in the demetalling zone must be raised to the decomposition temperature of the metal carbonyls carried by the hydroformylation reaction product. In the case of cobalt carbonyls this temperature must be at least about 250° F. and preferably about 275° F. to about 300° F. To decompose the remaining metal carbonyls present, which have been previously defined, the temperature level must be at least about 400° F. and preferably about 425° F. to about 450° F. This temperature is obtained, in the preferred embodiment, adjacent the upper portion of the demetalling zone by the introduction therein of a hot aqueous fluid or water through line 38. As illustrated in the drawing the water will give up a portion of its heat as it moves downwardly through the demetalling zone and therefore a temperature gradient will exist therein, although if desired external means can additionally be used to maintain a uniform temperature throughout the demetalling zone. The aqueous fluid entering line 38 must be such that it will not react, contaminate or otherwise adversely affect the hydroformylation reaction product being demetalled. In a preferred embodiment the hot water entering line 38 is the hot water removed from the hydroformylation reaction zone in line 13.

One of the critical features of the present invention resides in the manner in which the hydroformylation reaction product is moved through demetalling zone 36. Merely introducing the hydroformylation reaction product in the demetalling zone and permitting it to rise indiscriminately through the aqueous fluid, if possible, would not result in effective demetalling and a carryover of hydroformylation reaction product in line 44 and excessive water in line 42 would result. We have found that in order to obtain satisfactory demetalling and avoid the adverse effects noted above the hydroformylation reaction product must be moved through the aqueous medium in the form of drops, with the former being the continuous phase and the latter the discontinuous phase. We have found that the drop size of the hydroformylation reaction product is extremely important and must be about $1/64$ to about $1/2$ inch in diameter, preferably about $1/16$ to about $3/16$ inch in diameter. In the event the drops are smaller than about $1/64$ inch they will have difficulty in rising in the demetalling zone but instead will tend to form a stable suspension with the water and be carried out therewith in line 44. If the drops were larger than about $1/2$ inch the drops would be so large that the surface to volume ratio of the drops would be too low to permit efficient demetalling. The surface to volume ratio is extremely important for good demetalling because the heat necessary for the demetalling reaction has to pass in and the cobalt out through the surface of the drops. To obtain the proper drop size in the demetalling tower, the portion of line 34 lying within the tower is provided with suitable orifices 46.

While the method of forming the drops of hydroformylation reaction product in the water adjacent to the bottom of the column is not critical and, in fact, any method for dispersing the hydroformylation reaction product which gives the desired drop sizes may be used, we prefer to use simply circular holes drilled in the side or closed end of a conduit or series of conduits as the dispersion nozzles. The number of dispersion nozzles to be used is determined by the inside diameter of the dispersion nozzle and the velocity through the dispersion nozzle. We have found that the velocity through this type of dispersion nozzle is critical and that only a very narrow range of velocities will give the desired drop sizes, as will be shown hereinafter.

The contact time of the droplets with the aqueous medium is extremely critical in order to decompose the metal carbonyls. We have found that at least about one-fourth minute and preferably about one-half to about 5 minutes contact time is sufficient for excellent demetailing in accordance with the present invention.

The amount of aqueous medium and hydroformylation reaction product moved through the demetalling zone is also critical. Thus the amount of water or other aqueous medium must be sufficient to carry the amount of heat required for the demetalling operation. The feed rate of the hydroformylation reaction product must be carefully controlled, for if too much is introduced into the demetalling zone the number of droplets present will be so great that they will begin to coalesce and destroy the desirable drop-size distribution. In general, satisfactory demetalling takes place when about one-tenth to about 3 and preferably about 1.5 volumes of hydroformylation reaction product is moved through the demetalling zone per volume of water.

The pressure under which the demetalling operation takes place is not critical as long as it is high enough to maintain the water in the liquid phase. For an operating temperature of about 300° F., or above, of course it will be necessary to operate at a pressure above atmospheric, preferably up to about 100 to about 300 or more pounds per square inch.

Without being bound thereby, we believe that the cobalt or other metal resulting from the decomposition is removed from demetalling zone 36 in a soluble form in the aqueous medium, perhaps as the cobalt salt of an acid, for example, either the acid formed during the hydroformylation reaction itself or the acid whose salt was fed to the hydroformylation reaction zone. Under the conditions set forth above, however, the aqueous solution is not saturated with the metal compound and therefore the flow rate of the aqueous solution will be determined in accordance with its function of carrying heat to the demetalling tower.

As stated, the aqueous fluid in line 44 carrying with it dissolved metal salts is removed from the system, and the substantially completely demetalled hydroformylation reaction product is removed overhead by line 42. In order to aid the hydroformylation reaction product droplets in coalescing, a demister 48, which can be essentially a section of wire mesh, can be mounted near the top of the demetalling zone.

While the product removed from the demetalling zone has at least about 50 percent by weight, and preferably at least about 75 percent by weight of the metal carbonyls removed therefrom in said zone, the product nevertheless after treatment will still contain at least about 0.5 percent by weight of metal carbonyls originally present and in most cases, at least about one percent by weight of metal carbonyls originally present. The metal carbonyls still present, though small, will still in most cases be detrimental to the subsequent reactions to which the hydroformylation reaction product is put. Therefore it is usually necessary that it be further treated to remove substantially all of the metal carbonyls therefrom. This can be effected in any desired manner, for example, by heating the same directly or indirectly with steam to the decomposition temperature of the metal carbonyls remaining.

In the preferred embodiment of the invention the remaining metal carbonyls are removed from the hydroformylation reaction product by passing the product in line 42 at the temperature and pressure existing adjacent the top of demetalling zone 36 downwardly into demetalling chamber 50 packed with an inert material such as pumice or the like, wherein the pressure can be about 200 to about 300 pounds per square inch. In the preferred embodiment a temperature gradient is maintained within demetalling chamber 50 with a temperature of about 400° F. near the base thereof and a temperature of about 125° F. near the top. In this way cobalt carbonyl, if present, will decompose near the top and deposit free metal on the packing material and the remaining metal carbonyls, having a higher decomposition temperature will decompose near the bottom of the chamber and deposit free metal on the pumice. In this way the free metals are deposited in different portions of the chamber and can be separately recovered.

The necessary temperatures in the demetalling chamber are obtained by passing steam, such as saturated steam at a pressure of about 400 to about 500 pounds per square inch and a temperature of about 400° to about 500° F. into demetalling chamber 50 by lines 52 and 54 at a point near the bottom of the chamber. An inert gas such as hydrogen is introduced into the demetalling chamber 50 by lines 56 and 58 at a point above the point where the steam is initially introduced. Additional steam in line 60 is combined with additional hydrogen in line 62 and the mixture introduced by line 64 into demetalling chamber 50 at a point vertically above the point where hydrogen is initially introduced into demetalling chamber 50. In like manner, additional steam in line 66 is combined with additional hydrogen in line 68 and the mixture introduced by line 70 into demetalling chamber 50 at a point vertically above the point wherein the original mixture of steam and hydrogen is introduced in demetalling chamber 50. In this way the necessary temperature gradient referred to above is obtained, and the metals resulting from the decomposition are deposited on the packing material. A mixture of hydrogen and carbon monoxide resulting from decomposition of metal carbonyls is removed overhead from demetalling chamber 50 by line 72. While only one demetalling chamber has been shown, it is obvious that additional ones in series or parallel can also be employed if desired.

The advantage of employing both of the defined demetalling zones in removing metal carbonyls from hydroformylation reaction product resides in the fact that the metal carbonyls are easily and economically removed therefrom. In demetalling zone 36, which acts in the present process as a pre-demetalling zone, substantially all of the metal carbonyls are quickly removed from the hydroformylation reaction product. In demetalling chamber 50 the last traces of metal carbonyls are effectively removed and the free metals deposited on the packing therein. Since most of the metal has already been removed in demetalling zone 36, little metal will deposit on the packing material in demetalling chamber 50 and therefore the latter chamber can be operated for extensive periods of time before the packing therein will require rechanging, thereby lengthening its useful life. In the event it is desired to pass the demetalled product from the first demetalling zone directly to the hydrogenation reactor without subjecting it to the action of the second demetalling zone this can of course be done, although such procedure is not preferred for the reasons previously noted.

The hydroformylation reaction products which are removed substantially free of metal carbonyls from demetalling chamber 50 by line 74 together with water resulting from condensation of steam are passed through cooler 76 where they are cooled to a suitable low temperature such as about 100° F. From cooler 76 the product is passed by line 78 to separator 80 wherein water is removed from the base thereof by line 82 and demetalled hydroformylation reaction product by line 84. The product in line 84 can be further treated to recover the aldehydes or transferred to a hydrogenation zone wherein the aldehydes are converted to the corresponding alcohols.

The invention can be further illustrated by reference to the following examples. In Example I below the criticality of the temperature required to effect satisfactory demetalling is illustrated.

*Example I*

32 standard cubic feet per hour of hydrogen and carbon monoxide at a temperature of 72° F. in a molar ratio of 1.1 to 1 were passed together with 0.475 gallon per hour of heptene and 0.046 pound per hour of the cobalt salt of 2-ethylhexanoate through an elongated coil having an internal diameter of 0.302 inch and a length of 365 feet which was maintained under a pressure of 3500 pounds per square inch and a temperature of 350° F. At the end of 45 minutes a hydroformylation reaction product containing 55 percent by weight of isooctylaldehyde and metal carbonyls was obtained. This product was moved upwardly through a column of hot water 6 feet long having an internal diameter of 2.067 inches. The hydroformylation reaction product was introduced in the bottom of the column in the form of droplets having an average diameter of ⅛ inch at the rate of 1800 milliliters per hour, while the hot water was introduced into the top of the column at the rate of 900 milliliters per hour. The water containing the dissolved cobalt carbonyl was removed from the base of the demetalling zone, while the demetalled hydroformylation reaction product was removed from the top thereof. The results obtained are set forth below in Table I.

TABLE I

| Run No. | Temperature at Top of Column, °F. | Cobalt Stream: Feed | Content of Mg./Ml. Product | Percentage of Removal of Cobalt |
|---|---|---|---|---|
| 1 | 240 | 0.505 | 0.346 | 31.5 |
| 2 | 270 | 0.505 | 0.0290 | 94.2 |
| 3 | 300 | 0.505 | 0.0062 | 98.8 |

From the above table it is apparent that in order to remove a substantial amount of metal carbonyl from the hydroformylation reaction product it is essential that the temperature of the aqueous fluid in contact therewith be at an elevated level, preferably at a temperature of about 300° F. The treated hydroformylation product will nevertheless still contain an appreciable amount of metal carbonyl, and accordingly will have to be subjected to additional demetalling treatment. Thus the treated product in Run No. 3 additionally containing 0.0089 milligram of iron per milliliter of product is led into a demetalling zone similar to 50 together with 0.88 pound per hour of steam at a temperature of 380° F. and a pressure of 250 pounds per square inch. The cobalt content of the treated product in line 74 was 0.00001 milligram per milliliter of product and 0.0003 milligram of iron per milliliter of product.

The following example shows the effect of dispersion nozzle size on allowable velocity for a given droplet size.

TABLE II

| Dispersion Nozzle Diameter, Inches | Feed from Heptene Dispersion Nozzle, Velocity in ft./sec. | | | Feed from Tetrapropylene Dispersion Nozzle, Velocity in ft./sec. | | |
|---|---|---|---|---|---|---|
| | Optimum | Minimum | Maximum | Optimum | Minimum | Maximum |
| .024 | 5.7 | 2.7 | 9.5 | 6.3 | 2.2 | 11.1 |
| .046 | 7.2 | 5.0 | 9.1 | 8.0 | 5.1 | 11.0 |
| .067 | 5.6 | 4.2 | 6.8 | 6.0 | 5.0 | 7.2 |
| .104 | 5.0 | 4.2 | 5.8 | 5.4 | 4.8 | 6.3 |
| .161 | 4.3 | 3.5 | 4.9 | 4.6 | 4.0 | 5.1 |

It is noted that the dispersion nozzle diameters varied widely and cover the normal commercial ranges. It is important to note that the allowable operating range narrows as the dispersion nozzle size increases. For example, for a given isooctyl aldehyde feed rate, and 0.161 inch diameter dispersion nozzle, the number of dispersion nozzles must be such that the velocity is held between 3.5 and 4.9 feet per second in order to produce drop sizes in the preferred range. If 0.024 inch dispersion nozzles are used, the velocity may be permitted to vary from 2.7 to 9.5 feet per second. It should be pointed out that the results obtained using the hydroformylation reaction product prepared from heptene correspond closely to the results obtained using the hydroformylation reaction product obtained from tetrapropylene.

The effect of drop size on decobalting efficiency is shown below in Example III.

*Example III*

The hydroformylation reaction product of Example I was moved upwardly through a column 15 feet long and having an internal diameter of 2.067 inches filled with hot water having a temperature of 275° F. at the top of the column. The hydroformylation reaction product was moved through the column at a constant rate of 5780 milliliters per hour and the hot water was moved downwardly through the column at a constant rate of 3630 milliliters per hour. The dispersion nozzle diameter, and with it the drop size of the hydroformylation reaction product, was varied, however. The results obtained are tabulated below in Table III.

TABLE III

| Run No. | Dispersion Nozzle Diameter, Inches | Approximate Drop Size, Inches | Dispersion Nozzle Velocity, ft./sec. | Cobalt, mg./ml. | | Percent Cobalt Removal | Volume Percent Aldehyde in Exit Water |
|---|---|---|---|---|---|---|---|
| | | | | Charge | Product | | |
| 4 | .042 | ⅛″ | 5.9 | .505 | .029 | 94.3 | <.01 |
| 5 | .023 | <1/64″ | 19.2 | .505 | .033 | 93.5 | 5.52 |
| 6 | .065 | >¼″ | 2.5 | .505 | .056 | 88.9 | <.01 |

*Example II*

The hydroformylation reaction product prepared in accordance with the procedure set forth in Example I as well as one prepared using tetrapropylene at a reaction temperature of 380° F. but otherwise similar conditions were introduced into the bottom of a water-filled column having an internal diameter of 2 inches in the form of droplets by passage through dispersion nozzles having diameters of 0.024, 0.046, 0.067, 0.104 and 0.161 inch, respectively. In this study the optimum velocity through the dispersion nozzle was that taken as necessary to obtain an average drop diameter of ⅛ inch, the minimum was that taken as necessary to obtain a drop size no larger than ¼ inch, and the maximum was that taken as necessary to obtain a drop size no smaller than 1/64 inch. The results are set forth below in Table II.

From the above it is apparent that Run No. 4, which was operated under optimum conditions, resulted in excellent decobalting and substantially no product loss. While the amount of decobalting in Run No. 5 was substantial, considerable product was lost since the average drop size was too small. If the average drop size of the hydroformylation reaction product in Run No. 6 had been smaller, even better decobalting would have resulted.

Results similar to the above will be obtained using hydroformylation reaction products produced from higher olefins. Thus when the hydroformylation reaction product produced from tetrapropylene, as described in Example II, was passed through the same column as above at a feed rate of 8040 milliliters per hour countercurrent to 5050 milliliters per hour of water whose tower top temperature was 279° F., the cobalt content thereof was reduced from 0.505 to 0.0388 milligram per milliliter for a removal of 92.3 percent. The hydroformylation reaction product content of the exit water was only 0.13 percent by volume.

Obviously, many modifications and variations of the invention, as hereinabove set forth, can be made without departing from the spirit and scope thereof, and therefore only such limitations should be imposed as are indicated in the appended claims.

We claim:

1. A method of demetalling a hydroformylation reaction product obtained in the Oxo process containing at least one metal carbonyl which comprises passing through a demetalling zone an aqueous medium having a temperature of at least about 250° F., passing through said demetalling zone, at a contact time of at least about one-fourth minute, countercurrent to said aqueous medium, about one-tenth to about 3 volumes of said hydroformylation reaction product per volume of said aqueous medium in the form of droplets having a diameter of about $1/64$ to about $1/2$ inch, whereby a substantial amount of said metal carbonyl is decomposed, and thereafter separating said aqueous medium and said treated hydroformylation reaction product from each other.

2. A method of demetalling a hydroformylation reaction product obtained in the Oxo process containing at least one metal carbonyl which comprises passing through a demetalling zone an aqueous medium having a temperature of at least about 250° F., passing through said demetalling zone, at a contact time of at least about one-fourth minute, countercurrent to said aqueous medium, about one-tenth to about 3 volumes of said hydroformylation reaction product per volume of said aqueous medium in the form of droplets having a diameter of about $1/64$ to about $1/2$ inch, whereby a substantial amount of said metal carbonyl is decomposed, separating said aqueous medium and said treated hydroformylation reaction product from each other and thereafter further treating said treated hydroformylation reaction product to remove metal carbonyls remaining therein.

3. A process for preparing a hydroformylation reaction mixture substantially free of metal contaminants which comprises reacting an olefin with hydrogen and carbon monoxide in the presence of a metal carbonyl hydroformylation reaction catalyst in indirect heat exchange relationship with an aqueous medium to obtain a hydroformylation reaction product, passing through a demetalling zone said aqueous medium having a temperature of at least about 250° F., passing through said demetalling zone, at a contact time of at least about one-fourth minute, countercurrent to said aqueous medium, about one-tenth to about 3 volumes of said hydroformylation reaction product per volume of said aqueous medium in the form of droplets having a diameter of about $1/64$ to about $1/2$ inch, whereby a substantial amount of said metal carbonyl is decomposed and thereafter separating said aqueous medium and said treated hydroformylation reaction product from each other.

4. A method of demetalling a hydroformylation reaction product obtained in the Oxo process containing at least one metal carbonyl which comprises passing through a demetalling zone an aqueous medium having a temperature sufficient to decompose said metal carbonyl, passing through said demetalling zone, at a contact time of at least about one-fourth minute, countercurrent to said aqueous medium, about one-tenth to about 3 volumes of said hydroformylation reaction product per volume of said aqueous medium in the form of droplets having a diameter of about $1/64$ to about $1/2$ inch, whereby a substantial amount of said metal carbonyl is decomposed, and thereafter separating said aqueous medium and said treated hydroformylation reaction product from each other.

References Cited in the file of this patent

UNITED STATES PATENTS

| | | |
|---|---|---|
| 2,679,534 | Koontz | May 25, 1954 |
| 2,731,501 | Anderson et al. | Jan. 17, 1956 |
| 2,767,217 | Moise et al. | Oct. 16, 1956 |
| 2,779,794 | Catterall | Jan. 29, 1957 |
| 2,779,796 | Munger | Jan. 29, 1957 |
| 2,802,843 | Tramm et al. | Aug. 13, 1957 |
| 2,810,680 | Buchner | Oct. 22, 1957 |
| 2,815,390 | Gwynn et al. | Dec. 3, 1957 |

OTHER REFERENCES

Lucas et al.: "Principles and Practice in Organic Chemistry," Wiley & Sons, N.Y., 1949, pp. 80, 81.